Nov. 23, 1943.   D. A. KALOSHIN   2,334,932
BOAT
Filed Nov. 1, 1941

INVENTOR.
DMITRI ANDREIEVICH KALOSHIN
BY Alexander Kraloff
his attorney

Patented Nov. 23, 1943

2,334,932

UNITED STATES PATENT OFFICE 2,334,932

BOAT

Dmitri Andreievich Kaloshin, San Francisco, Calif.

Application November 1, 1941, Serial No. 417,506

2 Claims. (Cl. 115—0.5)

This invention relates to boats.

The object of this invention is to provide an open boat adapted to accommodate an automobile, which boat in combination with an automobile would take an appearance of a cabin boat.

Another object of this invention is to provide a boat having means for transmitting driving power of an automobile to a propelling means of the boat.

Another object of this invention is to provide a new steering means for a boat by which the latter is steered through the standard steering mechanism of an automobile.

Another object of this invention is to provide means for adjusting steering and driving means of a boat to fit various automobiles.

Other objects and advantages will appear as the specification proceeds and the particular features of the invention will be specifically pointed out in the appended claims.

In this specification and the annexed drawing, the invention is illustrated in the form considered to be the best, but it is to be understood, that the invention is not limited to such form; and it is also to be understood that in and by the claims following the description, it is desired to cover the invention in whatsoever form it may be embodied.

Figure 1:
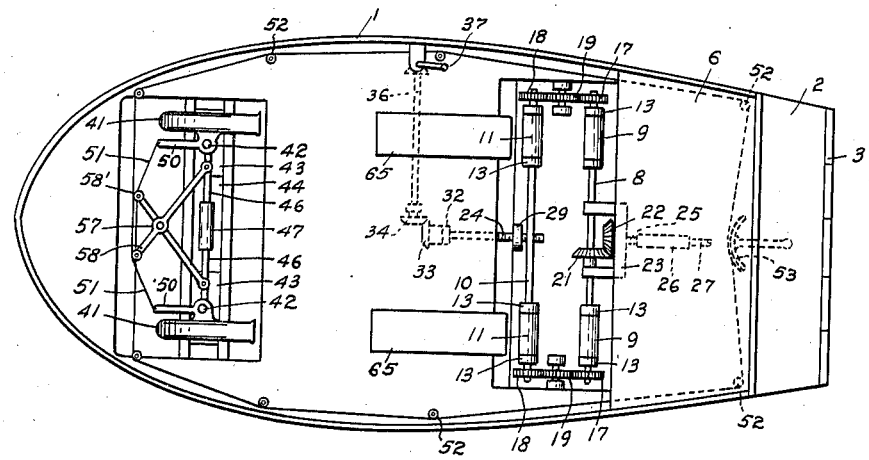
Fig. 1 is a plan view of a boat.
Figure 2:
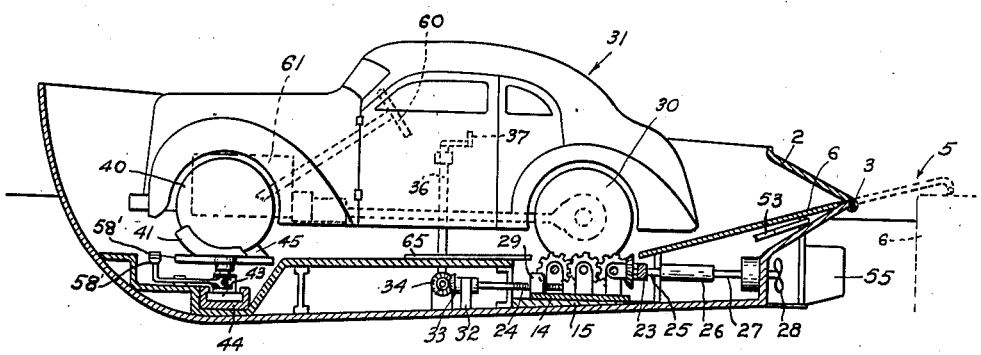
Fig. 2 is a vertical longitudinal cross-section of the boat showing an automobile therein.

My invention comprises a boat 1 which is preferably made out of light metal sheets and has a form shown in the drawing.

The boat 1 has a closure 2, hinged to the hull at 3 at the stern. The closure 2 serves as a platform for an automobile when it is opened, as shown at 5, and when the outer end of the closure 2 rests upon a wharf 6, to facilitate entering and leaving the boat. Means may be provided between the closure 2 and the hull to securely close the former upon the latter so as to prevent water from getting into the boat.

An inclined runway 6 extends from the hinge 3 into the boat and terminates in close proximity with a shaft 8 extending transversely to the main axis of the boat and carrying a pair of rollers 9 affixed to said shaft. A second shaft 10 carrying a pair of rollers 11 affixed thereto is arranged in close proximity of, and in parallel relation to, the shaft 8. Both shafts 8 and 10 are rotatably supported in the bearings 13, which are affixed to a platform 14 which is arranged to slide on a support 15. Each of the shafts 8 and 10 carry two gears 17 and 18 respectively on the ends thereof which gears mesh with idle gears 19 located therebetween.

The shaft 8 carries a bevel gear 21 which meshes with a bevel gear 22 carried by a support 23 rotatably supported by the shaft 8. The gear 22 rotates a shaft 25 which terminates in a splined coupling 26, carried by a shaft 27 to the outer end of which is attached a propeller 28.

The rollers 9 and 11 are designed to be rotated by the rear wheels 30 of an automobile 31 resting thereon. The wheels 30 are rotated by the power delivered by the automobile motor 61 in usual manner, and their rotation is utilized to rotate said rollers 9 and 11 and through the gears 21 and 22 and the shafts 25, coupling 26 and shaft 27, the propeller 28.

The provision is made to move the slidable platform 14 with the shafts 8 and 10 so as to accommodate automobiles of various wheel bases. The platform 14 carries a lug 29 having a threaded hole therein through which extends one end of a threaded shaft 24. The other end of the shaft 24 is supported in a bearing 32 and carries a bevelled gear 33. The latter gear is rotated through a system of gears 34, shafts 36 and by a handle 37. By rotating the handle 37, the platform 14 may be moved forward or backward so that the rear wheels 30 rest equally on both pairs of rollers 9 and 11. The front wheels 40 of the automobile 31 are supported on shoes 41, having rounded front ends which prevent an automobile from moving forward. Blocks 45 placed behind the wheels 40 prevent the same from moving backwardly. Each of the shoes 41 is rotatably supported by a pin 42 which is positioned substantially under a king pin of a normal automobile wheel, when the same rests on the shoe 41. By this arrangement, the movement of the front wheels around their king pins is made easy and practically effortless.

The pin 42 is imbedded in a block 43 slidable in a slide 44. Each of the pins 42 has a rod 46 attached thereto, the free end of which terminates in a turnbuckle 47. By turning the latter the distance between the shoes 41 may be adjusted to accommodate the automobiles of various treads.

Each of the shoes 41 has integral therewith a steering bar 50 to the outer end of which a cable 51 is attached. The latter through a system of pulleys 52 is connected to a rudder horn 53 by means of which a rudder 55 is swung about its vertical axis.

Means are provided for automatic adjustment of the length of the steering cables 51, while the distance between the shoes 41 is changed to fit the front wheels 40 of an automobile, said means comprising a pair of lazy tongs 57 having their ends 58 pivotally attached to the rods 41. Each of the free ends of said tongs 57 carries two pulleys 58', one for each of the cables 51.

When the shoes 41 are moved together, a slack is developed in the cables 51. At the same time as the distance between the ends 58 of the tongs 57 diminishes, the pulleys 58' are moved away from the shoes, and the cables 51 are tightened.

Planks 65 are provided to cover the rollers 9 and 11 while the front wheels 40 are passing over them. By swinging the front wheels 40 of an automobile by rotating the steering wheel 60 thereof, the shoes upon which said front wheels rest, are correspondingly swung. The movement of the shoes 41 will, through the cables 51, operate the rudder 55. By this arrangement the boat 1 may be steered through the steering apparatus of the automobile in a manner to which an average driver is so well accustomed.

The boat 1 is propelled by driving power of the automobile derived from the motor 61 through rotation of the rear wheels at various speeds. A driver of an automobile occupying his usual place is able to handle the boat in exactly the same manner as he handles his automobile driving the same on a highway. He can steer it, drive it at various speeds and backward by operating automobile control apparatus in usual customary manner.

Having thus described my invention, I claim:

1. A boat adapted to carry an automobile, and having a rudder, a pair of shoes upon which the front wheels of an automobile are adapted to rest, means operatively connecting said shoes with the rudder; a propeller, two pairs of rollers upon which the rear wheels of an automobile are adapted to rest, means operatively connecting said rollers with the propeller, and means for adjusting the position of said rollers to accommodate the automobiles of various wheel bases.

2. In a boat adapted to carry an automobile and having a rudder, means for steering said boat by the steering wheel of the automobile, comprising a pair of shoes upon which the front wheels of the automobile rest, means for changing the distance between said shoes to accommodate the automobiles having different tread, and means for operatively connecting the shoes with the rudder.

DMITRI ANDREIEVICH KALOSHIN.